Patented Oct. 30, 1951

2,572,916

UNITED STATES PATENT OFFICE 2,572,916

DIAZOAMINO COMPOUNDS

John J. Denton and Robert S. Long, Bound Brook, N. J., assignors to American Cyanamid Company, New York, N. Y., a corporation of Maine No Drawing. Application March 10, 1950, Serial No. 149,024

1 Claim. (Cl. 260—140)

This invention relates to an improved diazoamino compound and to alkaline printing solutions including the same.

There has been developed in the past few decades a process of dyeing or printing with azoic colors in which the diazo compound is "stabilized" by reacting with various compounds so that in alkaline solutions it will couple with ordinary azoic coupling components and can therefore be mixed therewith to form dye baths and, more particularly, printing compounds. The diazo compound is easily regenerated in weakly acidic medium and it is thus possible to print or to dye with the mixtures and then fix or develop the color on the fiber by treating with weak acids.

The most common form of stabilized diazo compounds are the diazoamino compounds, in which the diazo compound is reacted with a suitable amine, usually a secondary amine. Ordinarily the amines have solubilizing substituents such as sulfonic and carboxylic groups. Among the diazoamino compounds which have been prepared are those from N-alkyl glycines.

The problem presented by the diazoamino compounds and their use is not a simple one. Ordinary economic considerations dictate the desirability of ease of formation and isolation. The nature of the use requires solubility, stability under alkaline conditions, ease of regeneration with acid and freedom from undesired side reactions. Of these requirements, that of solubility is one of the most difficult to meet because it must be remembered that the diazoamino compounds are prepared in the first instance from solutions of highly soluble diazonium salts, and in order to obtain reasonable yields without excessive cost they must crystallize readily from these solutions and be easily isolated. On the other hand, once made they must be readily soluble in the proportions necessary for preparing printing pastes or other formulations in which they are to be used. A satisfactory compromise to meet these somewhat antagonistic requirements has been made in the case of printing pastes where the concentration is sufficiently low so that extraordinary solubility is not necessary. Of recent years, however, there has been an increasing demand on the part of users for a concentrated aqueous solution of the diazoamino compounds, which can be formulated into printing pastes with greater ease than is possible with the dry crystalline diazoamino compound. Solubility requirements in the case of concentrated solutions are much more severe, and stability on long storage in concentrated alkaline solutions also becomes a serious factor. It is very difficult to prepare really satisfactory diazoamino compounds which will not separate from concentrated solutions, especially at the low temperatures to which they may be subjected during transportation or storage in winter. With many colors it has been possible to prepare reasonably satisfactory concentrated solutions of the diazoamino compounds. Blue azoic colors have, however, presented a very serious problem, and the derivatives of tetrazotized dianisidine have not been available in the form of really satisfactory concentrated solutions. It is to this problem of stabilized tetrazotized dianisidine that the present invention relates.

According to the present invention, we have found that N-allyl glycine forms a diazoamino compound with tetrazotized dianisidine which, while readily isolated, shows extraordinary solubility and stability in concentrated aqueous solutions. Such a compound has the following formula:

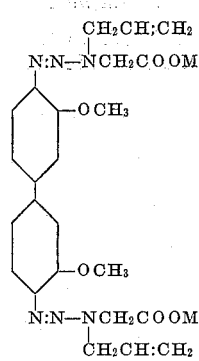

in which M is an alkaline metal. The properties are very markedly different from those of diazoamino compounds from N-alkyl glycines which are not satisfactory in the case of tetrazotized dianisidine. Why there should be such an enormous difference in solubility coupled with high stability when the glycine is substituted by an unsaturated radical is not known. It is one of the unexplained results sometimes encountered in dyestuff chemistry, and the present invention, therefore, is not intended to be limited to any theory of why there should be so great a change in properties with a comparatively small change in chemical formula, and why this should occur with the diazoamino compound of a particular diazo.

Although the diazoamino compounds of the present invention are readily salted out in the form of their sodium or other alkali metal salts, the disodium salt shows a solubility in alkaline solutions, even with the added coupling constituents, of from 6% to as high as 13% even at low temperatures.

The invention will be described in greater detail in the following examples, the parts being by weight.

Example 1

61 parts of dianisidine is dissolved in 1335 parts of water with 139 parts of 20° Bé. hydrochloric acid. The solution is cooled to 6° C. with ice and tetrazotized by the gradual addition of 87.6 parts of 40% sodium nitrite solution, the addition being below the surface. When tetrazotization is complete, the solution is gradually added at a temperature of 18° C. to a solution of 318 parts of soda ash and 60 parts of N-allyl glycine in 875 parts of water. The resulting solution is stored until formation of the diazoamino compound is substantially complete and then clarified by filtration using 40 parts of siliceous filter aid. The filtrate, which has a volume of about 4,000 parts, is stirred, and 600 parts of sodium chloride added. Salting out proceeds satisfactorily over a period of ten to twelve hours with gentle stirring. The diazoamino compound separates in the form of its disodium salt in excellent yield. The product is a yellow solid which is filtered, washed with alkaline brine and dried.

Example 2

A solution is prepared by dissolving 206 parts of the product of Example 1, 194 parts of the o-phenetidide of 2-hydroxy-3-naphthoic acid, 354 parts of ethylene glycol monoethyl ether, and 328 parts of 5 N sodium hydroxide solution in 1278 parts of water. A slight amount of sediment forms which is removed by filtration, and the filtrate is then stable against shipping and storage.

Example 3

553 parts (pure disodium salt content) of the product of Example 1, 591 parts 2-hydroxy-3-naphthanilide, 251 parts potassium hydroxide in the form of 50% aqueous solution, and 1500 parts of ethylene glycol monoethyl ether are dissolved in sufficient water to bring the total weight to 10,000 parts. The solution is stable and can be stored and transported even in cold weather.

Example 4

1,110 parts (pure disodium salt content) of the product of Example 1, 1,180 parts of 2-hydroxy-3-naphthanilide, 504 parts of potassium hydroxide in the form of 50% aqueous solution, and 3,000 parts of ethylene glycol are dissolved in water to make 10,000 parts. The solution, which contains 11–12% of the sodium salt of the diazoamino compound, is stable against storage and transportation at low temperatures.

We claim:

A compound of the formula

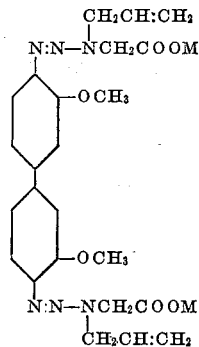

in which M is an alkaline metal.

JOHN J. DENTON.
ROBERT S. LONG.

REFERENCES CITED

The following references are of record in the file of this patent:

UNITED STATES PATENTS

| Number | Name | Date |
|---|---|---|
| 2,257,091 | Erickson | Sept. 30, 1941 |